(12) United States Patent
Juan (10) Patent No.: US 9,200,738 B2
(45) Date of Patent: Dec. 1, 2015

(54) FAST CONNECTOR STRUCTURE FOR CLEANERS

(71) Applicant: Chung-Chun Juan, Changhua (TW)

(72) Inventor: Chung-Chun Juan, Changhua (TW)

(73) Assignee: Yi-Jhong Development Co. Ltd., Changhua (TW)

(*) Notice: Subject to any disclaimer, the term of this patent is extended or adjusted under 35 U.S.C. 154(b) by 112 days.

(21) Appl. No.: 14/140,514

(22) Filed: Dec. 25, 2013

(65) Prior Publication Data

US 2015/0176741 A1   Jun. 25, 2015

(51) Int. Cl.
*F16L 37/48* (2006.01)
*F16L 37/084* (2006.01)
*E03C 1/086* (2006.01)

(52) U.S. Cl.
CPC .............. *F16L 37/48* (2013.01); *E03C 1/086* (2013.01); *F16L 37/0841* (2013.01)

(58) Field of Classification Search
CPC ......... F16L 37/48; F16L 21/035; E03C 1/086
USPC .............................................. 285/8, 317, 308
See application file for complete search history.

(56) References Cited

U.S. PATENT DOCUMENTS

| | | | | |
|---|---|---|---|---|
| 418,513 A * | 12/1889 | Hackley | ............................. | 285/8 |
| 793,103 A * | 6/1905 | Scholtz | .......................... | 285/317 |
| 1,279,459 A * | 9/1918 | Schoenberg | ..................... | 285/8 |
| 1,437,082 A * | 11/1922 | Armstrong | ......................... | 285/8 |
| 2,449,920 A * | 9/1948 | Williams | ....................... | 285/314 |
| 2,467,922 A * | 4/1949 | Woytal et al. | ...................... | 285/8 |
| 2,476,172 A * | 7/1949 | Williams | ...................... | 285/317 |
| 3,110,445 A * | 11/1963 | Benjamin et al. | .......... | 239/428.5 |
| 5,447,343 A * | 9/1995 | Gajewski et al. | ............. | 285/317 |
| 6,783,364 B1 * | 8/2004 | Juan | ................................ | 433/80 |
| 7,264,180 B2 * | 9/2007 | Mueller | ..................... | 239/428.5 |

* cited by examiner

*Primary Examiner* — David E Bochna
(74) *Attorney, Agent, or Firm* — Che-Yang Chen; Law Office of Michael Chen (57) ABSTRACT

A fast connector for cleaners, which comprises: a connector body, two positioning pieces, a bottom plate and an water pipe, wherein the connector body has a water through hole in its center and the bottom portion which is expanded and formed into a recessed portion with two first openings. Two positioning pieces are reversely stacked, each having a through slot in its center, a push button at its outside, and a restored spring placed between the inner side surface of the push button and the second opening of the bottom plate which allows the positioning piece to move laterally and in opposite directions. The bottom plate has a through slot in its center, a trough on both sides of the slot, and two second openings for placing the positioning pieces.

4 Claims, 10 Drawing Sheets

FAST CONNECTOR STRUCTURE FOR CLEANERS

FIELD OF THE INVENTION

The present invention relates to a fast connector structure for cleaners, more particularly to a fast connector structure that employs a ring member for a secured circular positioning.

BACKGROUND OF THE INVENTION

Figure 9:
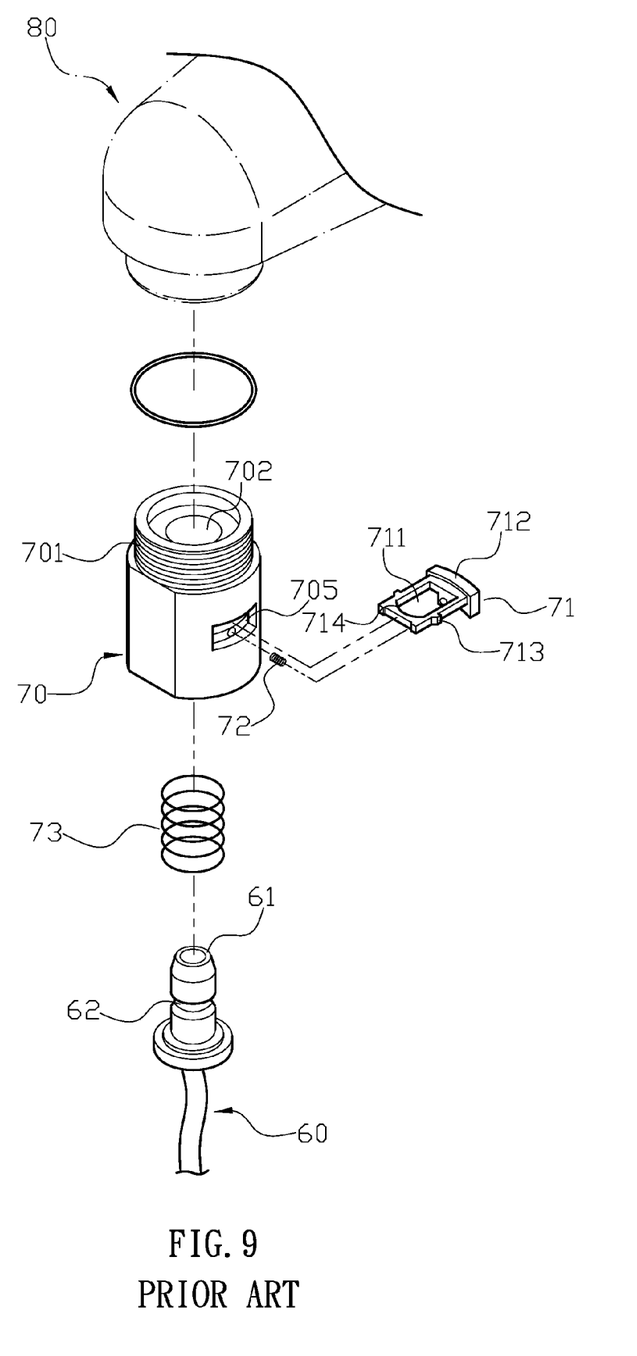
FIG. 9 is an exploded view of the fast connector structure for cleaners provided in the prior art.
Figure 10:
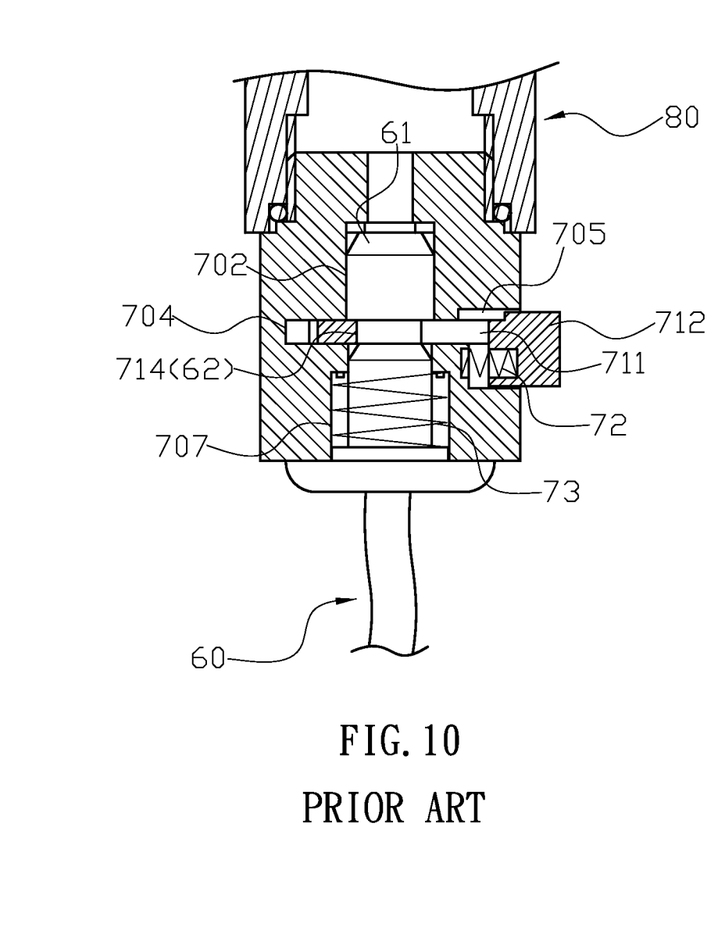
FIGS. 10 and 11 are exploded view of the fast connector structure for cleaners provided in the prior arts from different angles.
Figure 11:
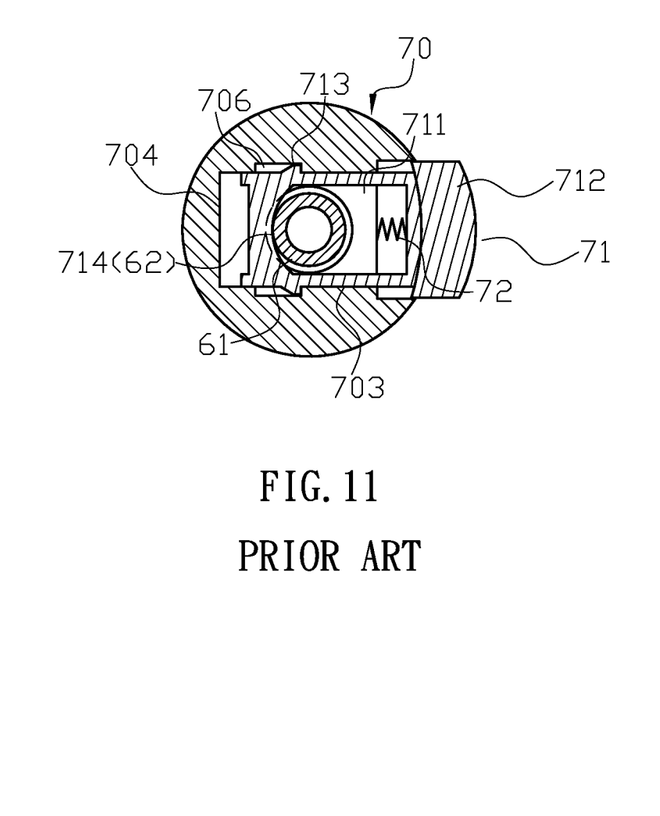

A conventional connector structure for cleaners is usually connected to a water faucet with screw bolts, and is pushed to contact the water faucet with the force generated by the screw bolts. These screw bolts have to be precisely aligned to achieve accurate positioning and a poor alignment likely causes a water leak. To solve this problem of the conventional connector structure, the inventor has previously invented a fast connector structure for cleaners as illustrated in FIGS. 9 to 11. The fast connector structure of the previous invention comprises a water pipe 60 and a fast connector 70, wherein one end of the fast connector 70 is connected to the water inlet end 61 of the water pipe 60, and the other end of the fast connector 70 is molded with thread 701 which allows it to be placed into the screw hole of the water outlet of the faucet 80. The fast connector 70 has a horizontal slot 703 located in the middle portion of the water hole 702, and the horizontal slot 703 has on one end a closed position limiting stopper 704, and on the other end an opening 705 through the side wall of the fast connector 70. The opening 705 is expanded downwardly and allows the interposition of a positioning piece 71, which has in its center a through slot 711 with a size larger than the water hole 72 and an inner side edge 714 at the inner end of the positioning piece 71. In addition, the positioning piece 71 has a push button 712 located at the end that protrudes out from the horizontal slot 703, and there is a spring 72 placed between the inner side of the lower part of the push button 712 and the wall of the opening 705 which maintains the positioning piece 71 to be pushed outwardly. In addition, the positioning piece 71 has two horizontally extended portions 713 located at the inner ends of both its left and right borders, which are to be placed into the recessed portions 706 of the horizontal slot 703, and the recessed portions 706 of the horizontal slot therefore prevent the positioning piece 70 to slide out from the horizontal slot 703. Furthermore, the bottom end of the water hole 72 of the fast connector 70 is formed into a reamed zone 707 which is installed with a spring 73, and the water inlet end 61 of the water pipe 60 has a recessed ring slot 62, therefore when the water inlet end 61 of the water pipe 60 is inserted into the water hole 702 of the fast connector 70, the recessed ring slot 62 is placed at a position that fits the horizontal slot 711 of the positioning piece 71. As the positioning piece 71 is elastically pushed outwardly, the inner side edge 714 of the horizontal slot 711 is then interposed into the recessed ring slot 62 of the water inlet end 61, thereby achieving the proper positioning of the water inlet end 61 of the water pipe 60 and preventing the detachment of the water pipe 60 from the fast connector 70.

However, for the previously invented fast connector structure as above described, the inner side edge 714 of the positioning piece 71 blocks the recessed ring slot 62 at only one side and does not provides a full circle stabilization to the recessed ring slot 62 of water inlet end 61; therefore the contacting area as well as the positioning limiting strength are limited, which likely results in the detachment of the water pipe 60 from the fast connector 70 due to high water pressure and causes a dramatically reduced convenience in practical uses.

Therefore, there remains a need for a new and improved fast connector structure to overcome the problems stated above.

SUMMARY OF THE INVENTION

The goal of the present invention is to solve the following technical problem as previously described.

The present invention provides an improved fast connector structure that solves the problem of the lacking sufficient positioning strength to stably connect the water pipe to the connector.

The fast connector structure for cleaners of the present invention may include a connector body, two positioning pieces, a bottom plate, and a water pipe, wherein one end of the connector body is used for being connected with the water inlet end of a water pipe, and the other end is threaded for being installed into a screw hole of the water outlet of a faucet. A water through hole is located at center of the connector body, and the connector body is connected with a ring cap by a high-frequency sealing technique and the ring cap supports additional units including a bushing liner and a spring. In addition, the bottom of the connector body is expanded, and has a recessed portion connecting to the water through hole, and edge of the recessed portion has a first opening located at opposite sides of the recessed portion. Two positioning pieces are reversely stacked, with one placed upward and in one direction whereas the other one placed downward and in an opposite direction, allowing the two positioning pieces to move laterally towards opposite directions. Each of the two positioning pieces has in horizontal slot at center portion which is bigger than the water through hole, a pushing button on its outer end that protrudes out from the first openings of the bottom portion of the connector body, and an inner end that is closed to form an arc-shaped curved stopping edge. The stopping edge of each positioning piece has a heightened lip edge along the arc-shaped curve, and this heightened lip edge together with the un-heightened center of the positioning piece at a relatively low position form a ladder-shaped structure.

The bottom plate has a through hole at center portion and a trough is horizontally formed at an upper portion of the bottom plate. A stopping edge is formed on both sides of the trough, and a second opening is formed between two stopping edges. There is a restored spring, one end of which placed into the inner space inside of each push button and the other end of which placed surrounding a rod extending from the outer surface of trough at the position of the second opening of the bottom plate. This restored spring elastically pushes the positioning piece laterally and outwardly. One end of the water pipe that has a recessed ring slot is used as a water inlet end, and the other end is used for connecting cleaners.

The advantages of the fast connector structure for cleaners of the present invention over previously invented subject include:

(a) The fast connector structure for cleaners of the present invention utilizes two positioning pieces to block the arc-shaped surface of the recessed ring slot at both inner and outer sides, which provides a full circle stabilization to the water pipe and allows the water pipe to be stably connected to the connector body, thereby preventing the detachment of the connector body from the water pipe due to the force generated by high water pressure.

(b) The fast connector structure for cleaners of the present invention allows the water pipe to be stably connected to the connector body, thereby avoiding repeated assembly of the water pipe to the connector body due to detachment likely occur when using a conventional connector structure or the fast connector structure described in the previous invention, which is remarkably more convenient in practical uses.

DETAILED DESCRIPTION OF THE INVENTION

Further details of the fast connector structure for cleaners of the present invention, including the technical objective, the structural characteristics, and the advantages of the subject of the present invention will be described as following, with assistance of the drawings.

The fast connector structure for cleaners of the present invention, as illustrated in FIGS. 1 to 5, may include a connector body 10, two positioning pieces 20, a bottom plate 30, and a water pipe 40, wherein one end of the connector body 10 is used for the installation of the water inlet end 41 of the water pipe 40, and the other end is threaded for being installed into the screw hole of the water outlet opening of the faucet 50. The water through hole 102 is located in the center of the connector body 10, and the connector body 10 has a ring cap 11, a bushing liner 13, and a spring 14. The bottom portion of the connector body 10 is expanded and forms a recessed portion 103 that connects to the water through hole 102, and the edge of the recessed bottom portion 103 has two first openings 104 that are located at opposite sides of the recessed portion 103. Two positioning pieces 20 are reversely stacked, with one being placed upward in one direction whereas the other one being placed downward in the direction that is opposite to that of the first one, allowing the two positioning pieces 20 to move laterally towards opposite directions. Each of the two positioning pieces 20 has a horizontal through slot 201 at center portion that is bigger than the water through hole 102, and a push button 202 on its outer end that protrudes out from the first openings 104 of the bottom portion 103 of the connector body 10. In addition, there is a restored spring 21 located between the inner end surface of each push button 202 and the bottom surface of the second opening 34 of the bottom plate 30, which elastically pushes the positioning pieces 20 laterally and outwardly. Furthermore, the inner side edge 203 of the through slot 201 of each positioning piece 20 has a heightened lip edge 204 along the arc-shaped top curve, and this heightened lip edge 204 and the un-heightened center of the positioning piece 20 which is at a relatively low position together form a ladder-shaped structure. The bottom plate 30 has a through hole 31 at center portion thereof and a trough 32 on both sides of the through hole 31 for placing the positioning piece 20, and the outer sides of the trough 32 are heightened to from stopping edges 33. The stopped edges curve inwardly and remain open, thereby forming two second openings 34 located on opposites dies of the horizontal slots 31. Furthermore, the end of the water pipe 40 that is equipped with a recessed ring slot 42 is used as the water inlet end 41, and the other end is used for connecting cleaners.

Figure 1:
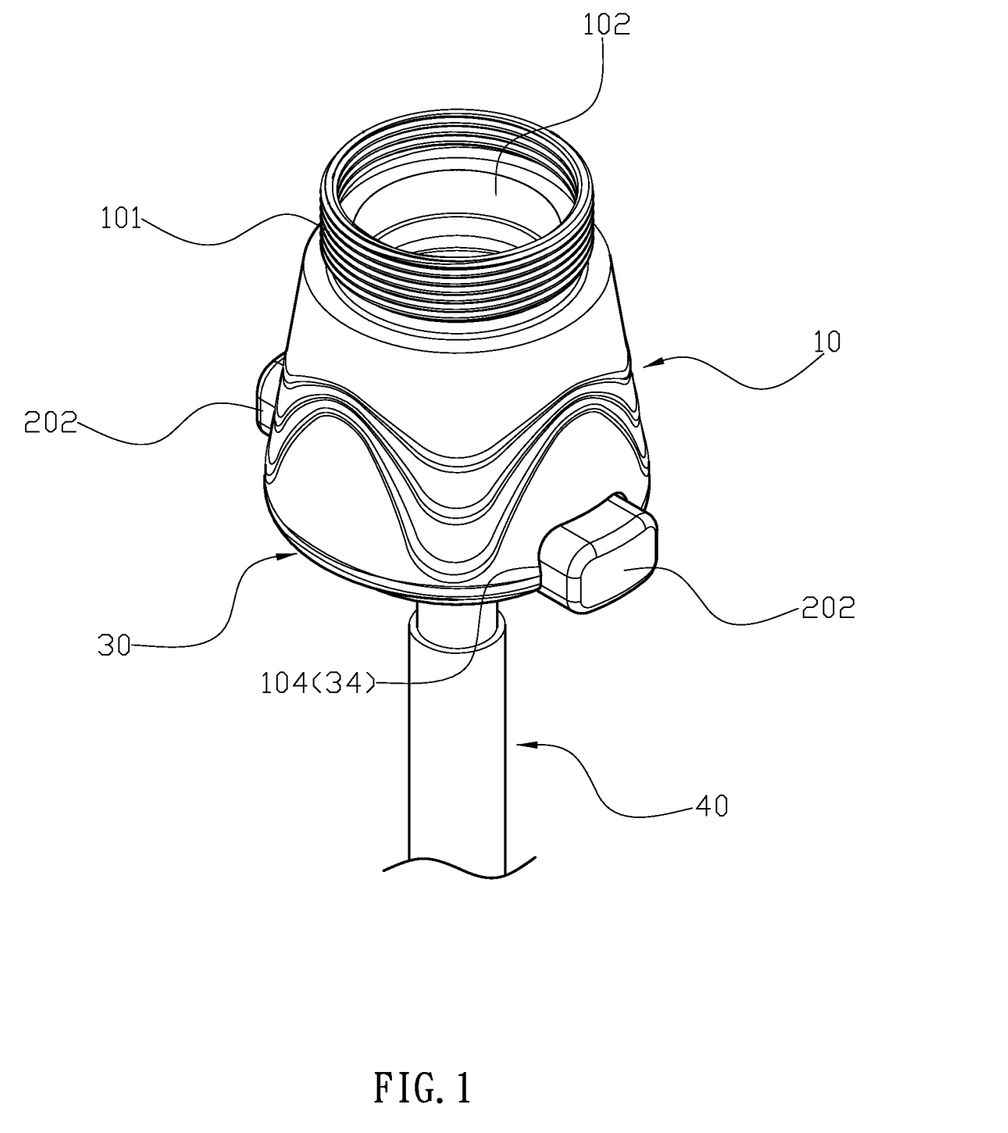
FIG. 1 is a three-dimensional combinational view of a fast connector structure for cleaners of the present invention.
Figure 2:
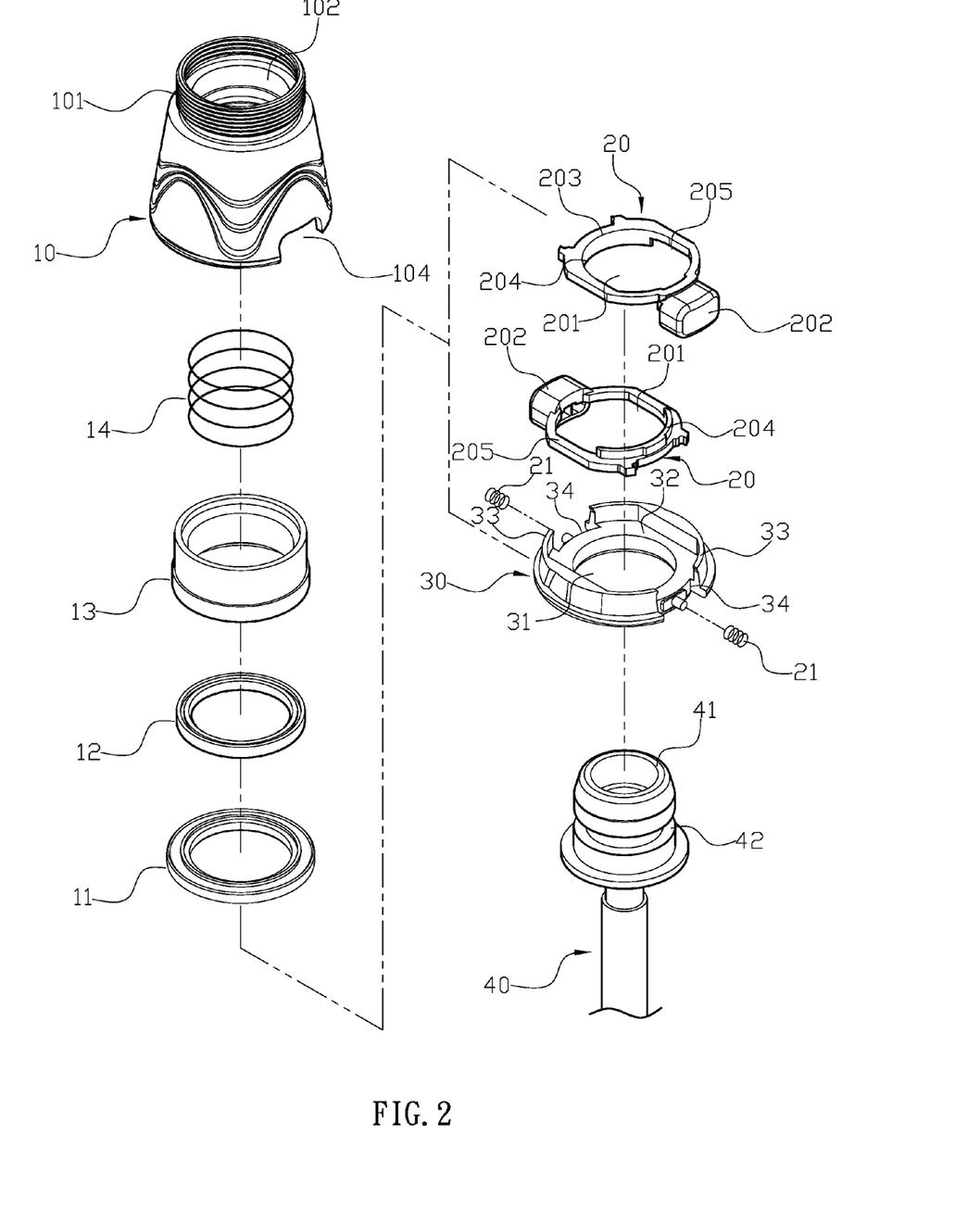
FIG. 2 is an exploded perspective view of the fast connector structure for cleaners of the present invention.
Figure 3:
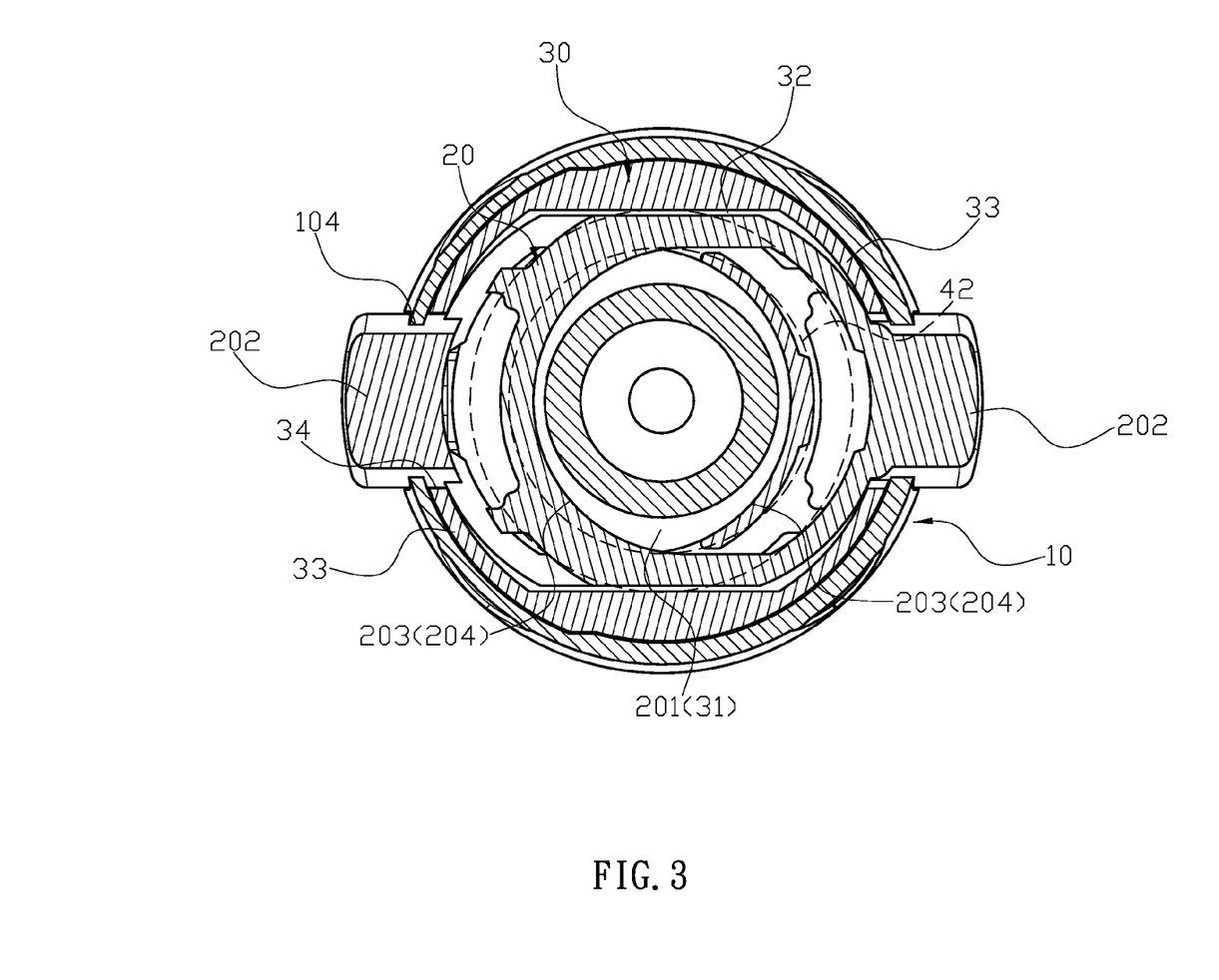
FIG. 3 is a sectional view of the fast connector structure for cleaners of the present invention.
Figure 4:
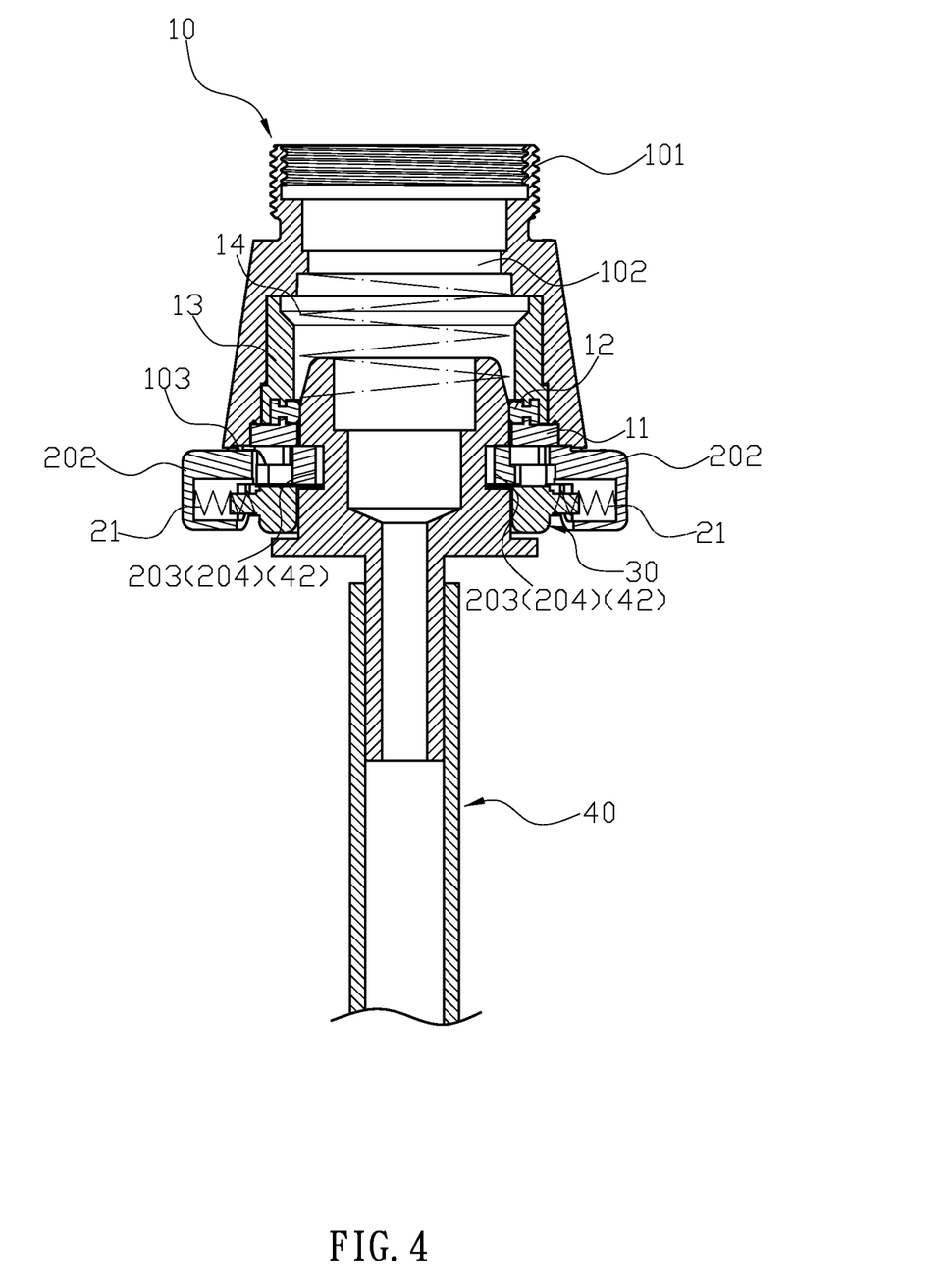
FIG. 4 is a sectional view of the fast connector structure for cleaners of the present invention when the water pipe is installed to the connector body.

The assembly of the fast connector structure for cleaners of the present invention is illustrated in FIGS. 1, 3, and 4. The two positioning pieces 20 are reversely stacked, with the first positioning piece 20 being placed onto the trough 32 of the bottom plate 30 with its heightened lip edge 34 pointing upward, whereas the second positioning piece being placed downward with its the heighted lip edges 204 to be fitted into the through slot 201 of the first positioning piece 20, thereby allowing the two positioning pieces to be closely placed and to contact each other with the borders 205 of two opposing positioning pieces 20. These two reversely stacked positioning pieces are placed onto the trough 32 located at both sides of the through slot 31 of the bottom plate 30. The restored springs 21 are then installed with each one being placed between the push button 202 and the neighboring second opening 34 of the bottom plate 30. With the above units installed, the bottom plate is then connected to the recessed portion 103 of the connector body 10 with a high-frequency sealing technique, allowing the push buttons 202 to protrude out from the corresponding first openings 103 and the second openings 34. The presence of the first and second openings, together with the function of the stopping edges 33 of the bottom plate 30, restrict the positioning of the positioning pieces 20 and prevents the positioning pieces 20 to detach laterally as the positioning pieces 20 are being pushed by the rest springs 21.

Figure 5:
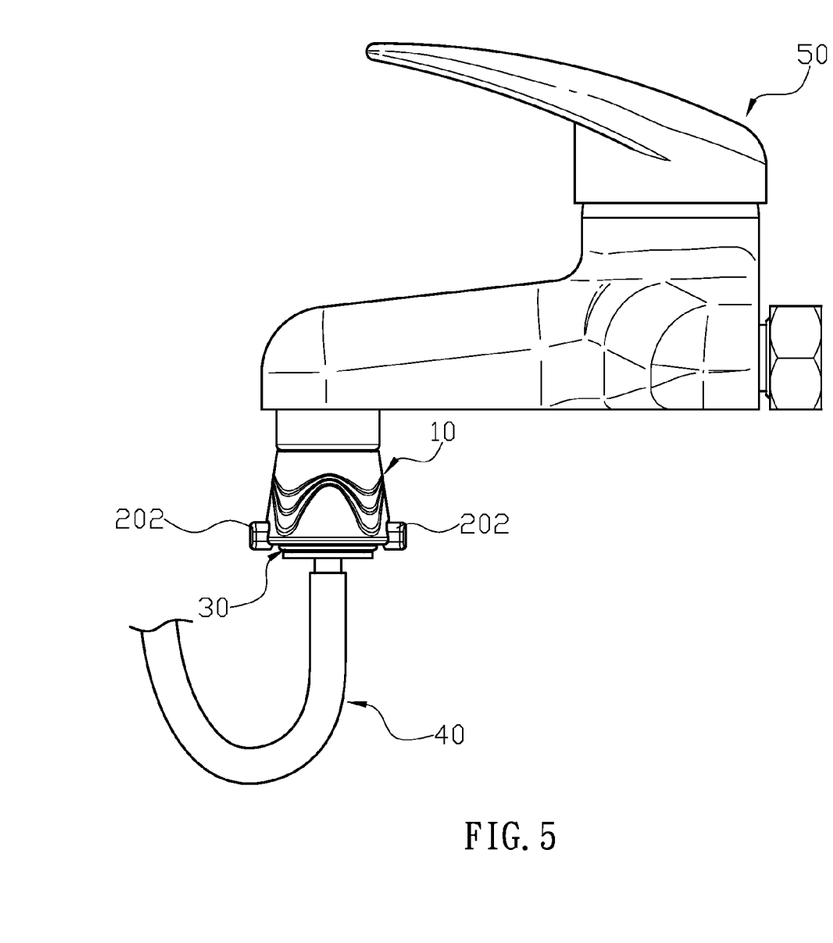
FIG. 5 is an illustration of the fast connector structure for cleaners of the present invention that is installed to a faucet.

The installation of the fast connector structure for cleaners of the present invention to a water faucet is illustrated in FIGS. 3 to 5. The water inlet end 41 of the water pipe 40 is installed by being inserted through the through slot 31 of the bottom plate 30. During this process, the movement of the water pipe 40 pushes the two positioning pieces 20 to retract elastically, which allows the water pipe 40 to pass through the through slots 201 of the two positioning pieces 20 as they are properly positioned, and allows the water pipe 40 to be inserted into the water through hole 102 of the connector body 10. As the water inlet end 41 is completely inserted into the connector body 10, the recessed ring slot 42 is placed at a position appropriate for full circle stabilization with the two positioning pieces 20. With the pushing force generated by the two restored springs 21, the two positioning pieces 20 moves in an outward direction, allowing the inner side edges 203 and the heightened lip edges 204 of the two positioning pieces 20 to be interposed into the recessed ring slots 42 from both sides, thereby providing a full circle stabilization to the water pipe 40 and ensuring the stable connection of the water pipe 40 to the connector body 10. This stable connection prevents the water pipe 40 to detach from the connector body 10 due to the force generated by high water pressure therefore increases the functional stability of the fast connector structure for cleaners of the present invention in practical uses.

Figure 6:
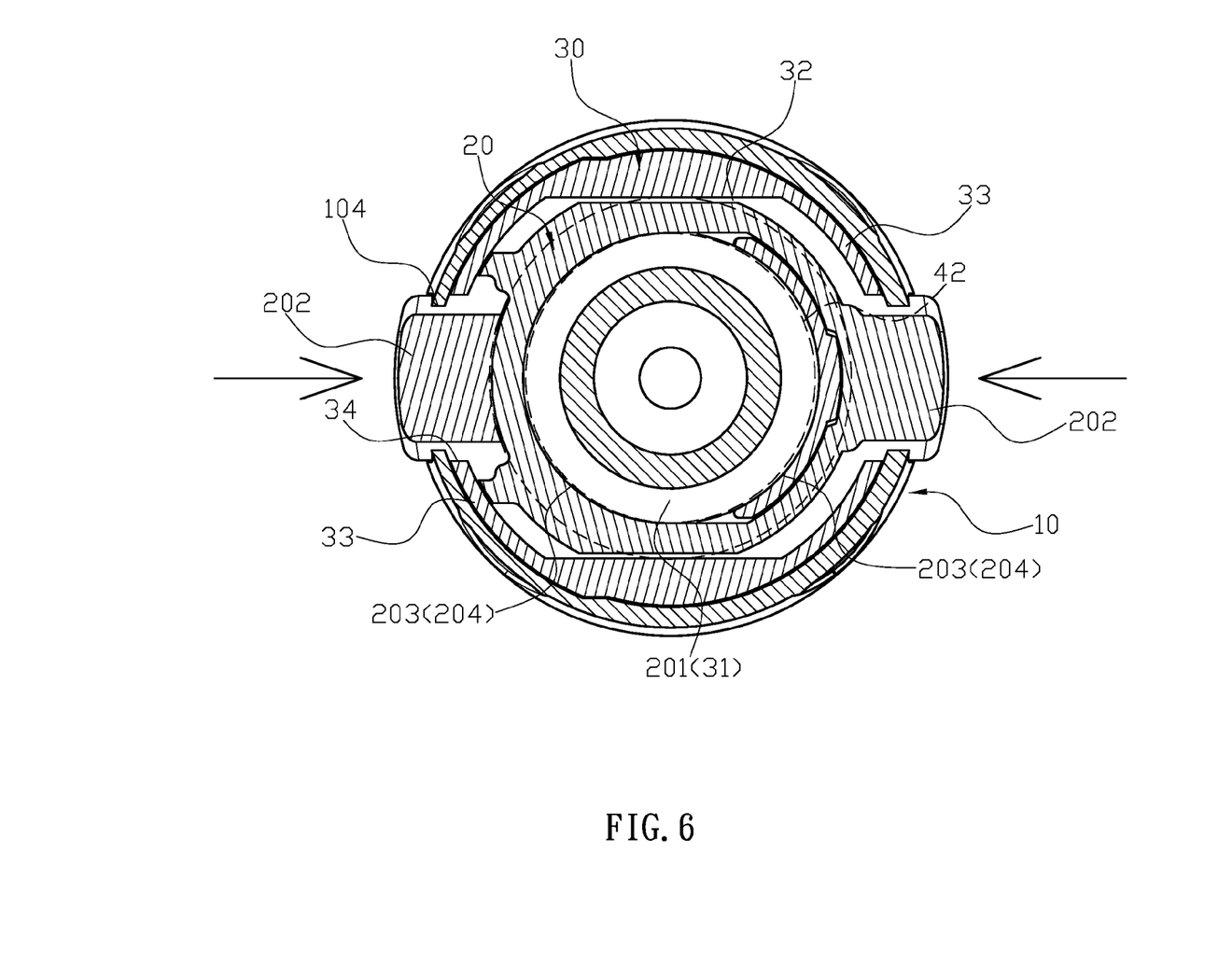
FIG. 6 is a sectional diagram of the fast connector structure for cleaners of the present invention when the push buttons are pressed.
Figure 7:
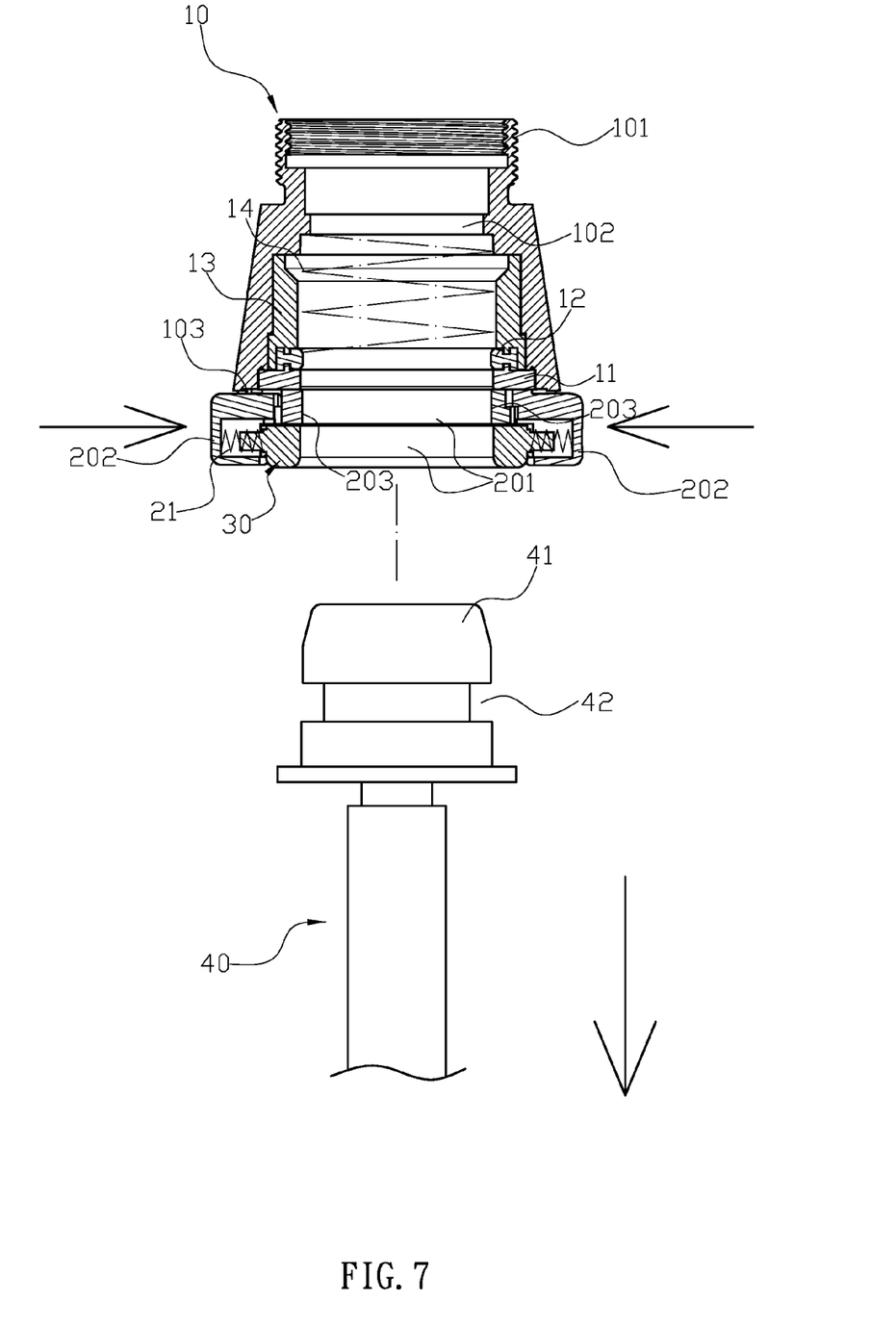
FIG. 7 is a diagram showing the uninstallation of a water pipe from the fast connector structure for cleaners of the present invention.
Figure 8:
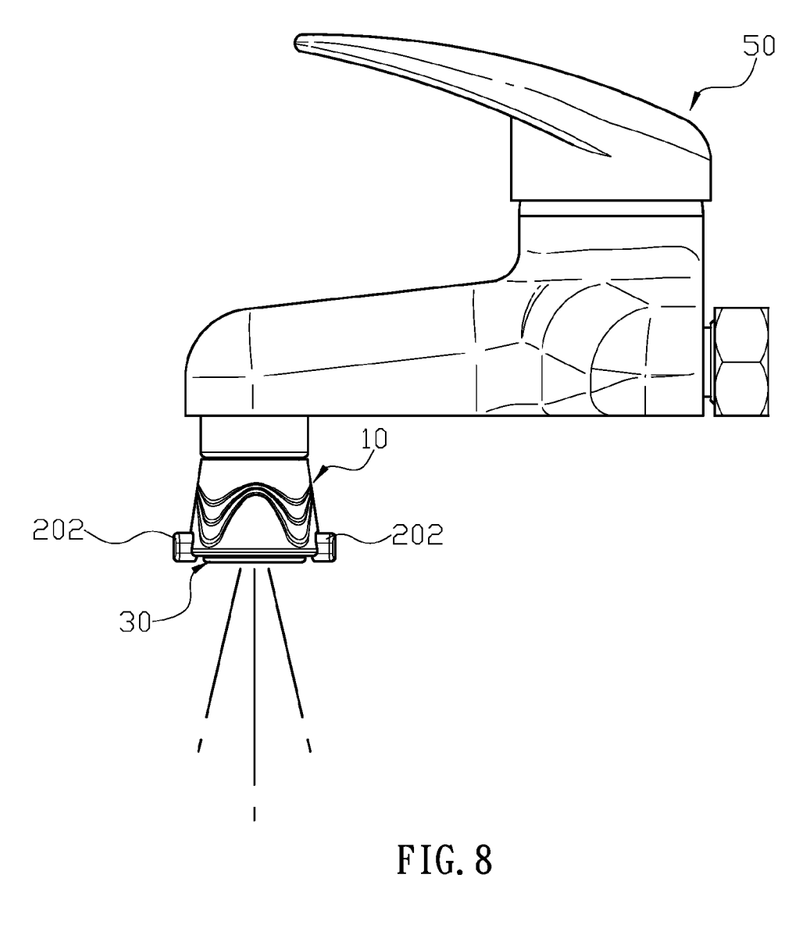
FIG. 8 is a diagram showing the water flowing out from the water through hole of the fast connector structure for cleaners of the present invention.

Uninstallation of the water pipe 40 from the fast connector structure for cleaners of the present invention is shown in FIGS. 6 to 8. When the two push buttons 202 are pressed, the two corresponding positioning pieces 20 are moved inwardly, which push the inner side edges 203 as well as the heightened lip edges 204 to slide out from the recessed ring slot 42, thereby removing the position limiting effect to the water pipe 40. As the water pipe 40 is being pushed downwardly by the spring 14 placed inside of the connector body 10, the water pipe 40 can thus be fast and readily removed from the connector body 10, without disconnecting the connector body 10 from the faucet 50. This feature thus allows the fast connector structure for cleaners of the present invention to be conveniently used for daily purposes.

The fast connector structure for cleaners of the present invention has the following advantages over a conventional connector structure and/or the previously invented subject: (a) The fast connector structure for cleaners of the present invention utilizes two positioning pieces 20 to stabilize the collection of the water pipe 40 to the connector body 10, which provides a full circle stabilization to the water pipe 40 and effectively prevents the detachment of the water pipe 40 from the connector body 10 due to the force generated by high water pressure; (b) The fast connector structure for cleaners of the present invention allows the water pipe 40 to be stably connected to the connector body 10, therefore it is unnecessary for repeated assembly of the water pipe 40 to the connector body 10 due to detachment likely occur when using a conventional connector structure or the fast connector structure described in the previous invention, which is remarkably more convenient for practical uses.

To summarize, the present invention describes a novel improved fast connector structure for cleaners with a breakthrough in structural design, further improved new components, and advantages in commercial exploration. The present invention has not been disclosed in any published materials and thus possesses novelty.

The above description and illustrations are for one or more exemplary embodiments of the present invention and should not be considered to limit the scope of the implementation of the present invention. Accordingly, the present invention is not to be considered as limited by the forgoing description, but includes any equivalents.

What is claimed is:

1. A fast connector structure for a cleaner comprising a connector body, two positioning pieces, a bottom plate and a water pipe,
    wherein one end of the connector body is used for accepting a water inlet of the water pipe, and the other threaded end of the connector body connects with a corresponding screw hole of a water outlet opening of a faucet, a spring installed in a water through hole located at a center of said connector body, the bottom portion of the connector body expanded and formed with a recessed portion connecting to the water through hole, and edge of the recessed portion having a first opening located at opposite sides of the recessed portion;
    wherein the two positioning pieces are reversely stacked, and one positioning piece is configured to move horizontally toward an opposite direction of the other positioning piece, each of the two positioning pieces having a through slot at a center portion of the positioning pieces, a push button located at an outer portion of the positioning piece protruding out from the first opening, and a restored spring installed at an inner surface of the push button and a second opening of the bottom plate to push said two positioning pieces outward with resilience force of the restored springs;
    wherein the bottom plate has a through hole at center portion thereof, a trough horizontally formed at an upper portion of the bottom plate, and a stopping edge is formed on both sides of the trough, and the second opening is formed between said two stopping edges;
    wherein one end of the water pipe has a water inlet end having a recessed ring slot, and the other end of the water pipe is used for connecting to the cleaner;
    wherein the two reversely stacked positioning pieces are placed into the bottom plate, and the restored springs are installed between said two push buttons and said two corresponding second openings, and the bottom plate is then placed into the recessed portion of the connector body, so the push button is able to protrude out from the aligned first openings and second openings restrict the position of the positioning pieces and prevent the positioning pieces from being pushed by said restored springs to detach laterally,
    wherein the water inlet end of the water pipe is inserted into the connector body via the through slot of the bottom plate and when the two positioning pieces are pushed by the water pipe to retract elastically and the through slots of the positioning pieces are aligned to allow the water inlet end of the water pipe to pass through and to enter the water through hole until the water inlet end is completely inserted into the connector body, the recessed ring slot of the water inlet end is aligned with said two positioning pieces, so said two positioning pieces are able to move outwards due to the resilient force of the restored spring, and inner portions of said two positioning pieces are disposed against curved surfaces of the recessed ring slots on both sides to form a circular stabilization of the water pipe.

2. A fast connector structure for cleaners of the claim 1, wherein center portion of the connector body has a ring cap connected to the connector body by a high-frequency sealing technique.

3. A fast connector structure for cleaners of the claim 1, wherein the connector body has a ring cap, a water sealing ring, and a bushing liner, and the ring cap is connected to the connector body with a high-frequency sealing technique and said ring cap supports said water sealing ring and said bushing liner.

4. A fast connector structure for cleaners of the claim 1, wherein an inner side edge of the through slot of each positioning piece has a heightened lip edge along an arc-shaped curved boarder of the through slot.

\* \* \* \* \*